United States Patent [19]

Bacskai

[11] Patent Number: 4,675,303

[45] Date of Patent: Jun. 23, 1987

[54] MIXED METAL ALKYL CATALYST FOR OLEFIN POLYMERIZATION

[75] Inventor: Robert Bacskai, Kensington, Calif.

[73] Assignee: Chevron Research Company, San Francisco, Calif.

[21] Appl. No.: 822,342

[22] Filed: Jan. 24, 1986

Related U.S. Application Data

[63] Continuation-in-part of Ser. No. 508,435, Jun. 27, 1983, Pat. No. 4,567,154.

[51] Int. Cl.⁴ .................................................. C08F 4/64
[52] U.S. Cl. .................................... 502/115; 502/105; 526/125; 526/142; 526/127; 526/151
[58] Field of Search .............................. 502/115, 105

[56] References Cited

U.S. PATENT DOCUMENTS

| | | | |
|---|---|---|---|
| 4,143,223 | 3/1979 | Toyota et al. | 502/105 X |
| 4,298,718 | 11/1981 | Mayr et al. | 502/105 X |
| 4,383,938 | 5/1983 | Langer | 502/115 |

OTHER PUBLICATIONS

Chemical Abstracts, 96:69614c, (1982).

Primary Examiner—Patrick P. Garvin
Attorney, Agent, or Firm—S. R. LaPaglia; R. C. Gaffney; C. J. Caroli

[57] ABSTRACT

A catalyst composition for use in polymerizing alpha olefins which comprises (a) a solid supported titanium tetrahalide complex, wherein said complex is prepared by contacting a mechanically pulverized solid support with titanium tetrahalide in the absence of mechanical pulverization, and (b) a cocatalyst comprising a mixture of a dialkyl aluminum halide and a dialkyl magnesium compound.

12 Claims, No Drawings

MIXED METAL ALKYL CATALYST FOR OLEFIN POLYMERIZATION

CROSS-REFERENCE TO RELATED APPLICATIONS

This application is a continuation-in-part of application Ser. No. 508,435, filed June 27, 1983 and now U.S. Pat. No. 4,567,154.

BACKGROUND OF THE INVENTION

The present invention relates to a catalyst for use in the polymerization of alpha olefins. More particularly, the present invention relates to a catalyst system comprising a titanium-containing component and a second component comprising a mixture of a dialkyl aluminum halide and a dialkyl magnesium compound.

It is known in the art that extremely reactive Ziegler-type catalysts can be prepared by reacting titanium tetrachloride with ethanol in the presence of a pulverized solid support, such as magnesium chloride. Frequently, esters of aromatic carboxylic acids are included in this preparation. The resulting solid complex is then mixed with a trialkyl aluminum compound, such as tri-isobutyl aluminum, to produce the final catalyst. When used to polymerize alpha olefins, these catalysts provide high yields of stereoregular polymer per part of catalyst. As a result, the catalyst normally does not have to be separated from the polymer to give a final polymer product of specification purity.

Accordingly, U.S. Pat. No. 4,143,223 describes a catalyst composition comprising a mechanically pulverized solid halogen-containing titanium catalyst component and an organoaluminum compound. The titanium catalyst component is obtained by reacting a titanium compound, such as titanium tetrachloride, with a pulverized solid product derived from a magnesium compound, an organic acid ester and an active hydrogen-containing compound selected from alcohols and phenols.

U.S. Pat. No. 4,107,415 describes a catalyst system comprising a catalyst-forming component which is an addition and/or substitution product of an electron-donor compound (or Lewis base) and an alkyl aluminum compound, and a supported catalyst-forming component obtained by contacting a titanium compound with a carrier which is a mixture of an active magnesium or manganese dihalide and a solid organic material which is inert to all other catalyst components. The electron-donor compound is typically an organic acid ester and the inert solid organic material is a compound such as durene, anthracene, acenaphthene or diphenyl.

Chemical Abstracts, 96:69614c (1982) describes a polymerization catalyst comprising an organic aluminum compound, such as triethyl aluminum, and a solid component obtained by reacting milled mixtures of magnesium dichloride, aromatic carboxylic acid esters and silicon tetrachloride with titanium tetrahalide in the presence of chlorinated hydrocarbons, such as dichloroethane.

SUMMARY OF THE INVENTION

The present invention provides a catalyst composition for use in polymerizing alpha olefins which comprises (a) a solid supported titanium tetrahalide complex, wherein said complex is prepared by contacting a mechanically pulverized solid support with titanium tetrahalide in the absence of mechanical pulverization, and (b) a cocatalyst comprising a mixture of a dialkyl aluminum halide and a dialkyl magnesium compound.

Among other factors, the present invention is based on my discovery that a mixed metal alkyl catalyst containing both a dialkyl aluminum halide and a dialkyl magnesium compound is extremely effective in polymerizing alpha olefins to provide highly stereoregular alpha olefin polymers in improved yield. This is particularly surprising in view of the fact that alkyl aluminum halides, which are known to form active Ziegler catalysts, by themselves do not provide effective olefin polymerization catalysts when mixed with solid supported titanium complexes. Similarly, dialkyl magnesium compounds by themselves do not produce good polymerization catalysts when mixed with titanium complexes.

Equally surprising, in view of the prior art teaching, is the discovery that a mixture of trialkyl aluminum and dialkyl magnesium does not form an active polymerization catalyst with the supported titanium complex.

Furthermore, it has been found that other mixed metal alkyls, such as the mixture of dialkyl aluminum halide and alkyl zinc or the mixture of dialkyl aluminum halide and alkyl boron, also provide inactive polymerization catalysts.

DETAILED DESCRIPTION OF THE INVENTION

The catalyst system of the present invention contains a solid supported titanium complex component and a cocatalyst component which comprises a mixture of a dialkyl aluminum halide and a dialkyl magnesium compound.

The titanium complex catalyst component may be any of the conventional solid titanium-containing complexes used in polymerizing alpha olefins, wherein the titanium is introduced into the complex without copulverization with the support. These titanium-containing catalyst components are well known in the art and are described, for example, in the aforementioned U.S. Pat. No. 4,143,223 and in Chemical Abstracts, 96:69614c (1982).

In general, the titanium complexes are obtained by contacting a titanium compound with a mechanically pulverized solid support, or carrier, in the absence of mechanical pulverization. Typically, the titanium compound will be a titanium tetrahalide, although other titanium compounds are suitable, such as alkoxytitanium halides. The preferred titanium compound is titanium tetrachloride.

The mechanically pulverized solid support will normally contain a magnesium compound, preferably a magnesium dihalide and more preferably, magnesium dichloride. Other magnesium compounds contemplated include alkoxy magnesium halides, aryloxy magnesium halides, and the like. Manganese dihalides may also be used in place of magnesium dihalides. The magnesium or manganese compounds should preferably be anhydrous.

Additionally, it is preferable to include a carboxylic acid ester in the final titanium complex. The carboxylic acid ester may be included as part of the pulverized solid support or it may be separately added to the titanium compound. Aromatic carboxylic acid esters are preferred, the most preferred being ethyl benzoate.

Other compounds have been variously described in the literature as useful in forming the titanium complexes. These compounds include alcohols such as ethanol; phenols such as cresol; and silicon tetrachloride. Often these compounds are introduced as part of the pulverized solid support.

The solid support may be mechanically pulverized in a ball mill, a vibratory mill, an impact mill, or the like, preferably under dry conditions in the absence of an inert diluent.

As used herein, the term "mechanically pulverized" or "mechanical pulverization" denotes pulverization which imparts a violent pulverizing effect to a material and excludes such means as mere mechanical stirring.

Suitable titanium complexes which are useful for forming the catalyst of the present invention include complexes comprising magnesium dichloride, ethyl benzoate, ethanol and titanium tetrachloride; complexes comprising magnesium dichloride, ethyl benzoate, cresol and titanium tetrachloride; and complexes comprising magnesium dichloride, ethyl benzoate, silicon tetrachloride and titanium tetrachloride.

The mixed metal alkyl component of the present catalyst comprises a mixture of a dialkyl aluminum halide and a dialkyl magnesium compound. The dialkyl aluminum halides which are suitable include dialkyl aluminum halides, having the empirical formula: $AlR_2X$, where R is alkyl and X is halogen. Generally, the alkyl group will contain from 2 to 8 carbon atoms. Preferred dialkyl aluminum halides are the dialkyl aluminum chlorides. A preferred dialkyl aluminum chloride is diethyl aluminum chloride.

The dialkyl magnesium compounds suitable for use in the catalyst of the invention are those having alkyl groups of 2 to 8 carbon atoms. Representative examples include dioctyl magnesium, dipropyl magnesium, ethyl propyl magnesium, and the like. A preferred magnesium compound is dibutyl magnesium.

The mixture of the dialkyl aluminum halide and the dialkyl magnesium compound has an aluminum to magnesium molar ratio of 1:5 to 5:1, preferably about 2:1. In a preferred embodiment, a small amount of a Lewis base is included in the aluminum-magnesium mixture. Usually, from about 0.05 to 0.5 moles of Lewis base per mole of total aluminum plus magnesium are sufficient. Preferred Lewis bases are the carboxylic acid esters, more preferably, the aromatic carboxylic acid esters. An especially preferred Lewis base is ethyl benzoate.

The alpha olefins are polymerized in contact with the present catalysts under conventional polymerization conditions. Polymerization is conducted at temperatures ranging from about 0° C. to 100° C., preferably from about 20° C. to 70° C. Polymerization pressure is generally about 3 to 16 atmospheres, preferably from about 5 to 10 atmospheres. The reaction is normally carried out over a period of about 1 to 24 hours.

The polymerization can be carried out either in the liquid or gaseous phase. When it is carried out in the liquid phase, an inert organic solvent can be used as a reaction medium or the olefin itself can be used as the reaction medium. Examples of inert organic solvents include aliphatic hydrocarbons of 4 to 8 carbon atoms such as hexane or heptane; cycloaliphatic hydrocarbons such as cyclohexane; and aromatics such as benzene, toluene or xylene.

In general, the alpha olefins suitable for use in polymerization include olefins having from about 2 to 8, preferably 2 to 5, carbon atoms. Typical olefins include ethylene, propylene, 1-butene, 4-methyl-1-pentene, 1-hexene, and the like. The present catalyst system is particularly useful in the polymerization of propylene and 1-butene.

The regulation of the polymer molecular weight during the polymerization is effected according to known techniques by operating, for instance, in the presence of hydrogen. The presence of hydrogen as a molecular weight modifier, operating with the catalysts of the present invention, does not appreciably reduce the activity and/or stereospecificity of the catalysts.

The polymerization can be carried out by any of batchwise, semi-continuous or continuous methods. It is also possible to perform the polymerization in two or more stages under different reaction conditions.

The following examples are provided to illustrate the invention in accordance with the principles of the invention but are not to be construed as limiting the invention in any way except as indicated by the appended claims.

EXAMPLES

In the following examples, the amount of stereoregular polymer formed was determined by Soxhlet extraction of the total polymer product over a period of 6 hours. An n-heptane solvent was used for polypropylene and an ether solvent was used for poly-1-butene.

The specific viscosity was determined for poly-1-butene using a Decalin solvent at 115° C. and a concentration of 0.1 g per 100 ml of solvent. The specific viscosity was determined for polypropylene using a Decalin solvent at 135° C. and a concentration of 0.1 g per 100 ml of solvent.

Abbreviations used in the examples include "Et" for ethyl, "Bu" for butyl, and "i-Bu" for isobutyl.

EXAMPLE 1

Polymerizations were carried out in a 1-liter, stainless steel autoclave. Before each run, the autoclave was heated to 120° C. for 2 hours and cooled to room temperature in dry, oxygen-free nitrogen. The propylene (99+%) used was dried over silica gel (Davison Grade 923) and the n-hexane solvent was dried over molsieve (Linde 1/16 inch pellets, 4A). All operations were performed under nitrogen.

The supported titanium complex used in this example was prepared according to the procedure described in Chemical Abstracts, 96:69614c (1982). Following this procedure, a mixture of 20 g $MgCl_2$, 12 ml (12.62 g) ethyl benzoate and 3 ml (4.45 g) $SiCl_4$ was ball milled for 46 hours to give a fine powder. An 8 g portion of the above powder was mixed with 400 ml 1,2-dichloroethane and 40 ml $TiCl_4$ and heated at 80° C. for 2 hours. The resulting complex was filtered, washed with n-hexane and dried in a nitrogen stream to give 5.78 g of catalyst containing 1.90 wt. % Ti.

For this example, the autoclave was charged with 163 g n-hexane, 1.4 mM $AlEt_2Cl$ (25% solution in toluene), 0.7 mM $MgBu_2$ (0.71 molar in heptane), 0.47 mM ethyl benzoate, and 0.031 g of an $MgCl_2$/ethyl benzoate/$SiCl_4$/$TiCl_4$ (Ti=1.90%) catalyst (0.589 mg Ti; 0.0123 mM Ti), prepared as described above, and 125 g liquid propylene. The autoclave was heated to 50° C. and was maintained at 50° C. for 3 hours. When necessary, cooling was applied by an internal water coil. Following polymerization, the autoclave was vented and the product was washed with methanol and dried in vacuum at 70°–80° C. (Alternatively, the polymer could be isolated by evaporation of the solvent.) The polymer yield was 118 g, corresponding to 200,300 g polypropylene/g Ti.

Propylene conversion was 94% and the yield of n-heptane insoluble polymer was 92%. The reduced specific viscosity was 4.4 dl/g.

EXAMPLES 2 to 16

Following the procedure of Example 1, 1-butene was polymerized with catalysts containing a titanium complex of magnesium dichloride, ethyl benzoate, ethanol and titanium tetrachloride, and a cocatalyst mixture of diethyl aluminum chloride and dibutyl magnesium. The results are shown in Table I. Various trialkyl aluminum cocatalysts are also shown for comparison.

The supported titanium complex designated "Catalyst A" in Table I was prepared according to the following procedure. Twenty grams of $MgCl_2$, 6.3 g ethyl benzoate and 15.0 g ethanol was mixed in 100 ml dry n-pentane. The pentane was evaporated and the resulting solid was transferred into a centrifugal-type ball mill. The solid was ball milled for 1.5 hours, resulting in a fine powder. A 5 g portion of the above powder was mixed with 50 ml $TiCl_4$ and was heated at 110° C. for 2 hours. The mixture was filtered, an additional 50 ml $TiCl_4$ was added and the mixture was reheated at 110° C. for 2 hours. The resulting complex was filtered, washed with hexane and dried in a nitrogen stream to give a catalyst containing 4.12 wt. % Ti. The supported titanium complex designated "Catalyst B" in Table I was prepared in a similar manner.

TABLE I
Polymerization of Pure 1-Butene With $AlEt_2Cl$ + $MgBu_2$[a]

| Example | Catalyst[c] | Cocatalyst[b] | Yield g | g PB/g Ti | Ether Insoluble % | Reduced Specific Viscosity, $h_{sp}/C$ |
|---|---|---|---|---|---|---|
| 2 | A | $AlEt_2Cl$ + $MgBu_2$ | 205.4 | 78,981 | 40.2 | 2.5 |
| 3 | A | $AlEt_2Cl$ + $MgBu_2$ + Et Benzoate | 7.2 | 2,781 | 91.6 | 13.7 |
| 4 | A | $AlEt_2Cl$ | 0.8 | 312 | — | 3.0 |
| 5 | A | $MgBu_2$ | Trace | — | — | — |
| 6 | A | $AlEt_2Cl$ + $BEt_3$ | Trace | — | — | — |
| 7 | A | $Al(i-Bu)_3$ | 54.1 | 20,800 | 67.6 | 5.6 |
| 8 | A | $Al(i-Bu)_3$ + $MgBu_2$ | Trace | — | — | — |
| 9 | A | $Al(i-Bu)_3$ + Et Benzoate | 4.3 | 1,662 | 91.2 | 12.2 |
| 10 | A | $AlEt_3$ | Trace | — | — | — |
| 11 | A | $AlEt_3$ + $MgBu_2$ | Trace | — | — | — |
| 12 | B | $AlEt_2Cl$ + $MgBu_2$ | 237.0 | 91,269 | 61.4 | 1.8 |
| 13 | B | $AlEt_2Cl$ + $MgBu_2$ + Et Benzoate | 229.0 | 88,150 | 76.0 | 2.5 |
| 14 | B | $Al(i-Bu)_3$ | 102.5 | 39,438 | 82.0 | 4.1 |
| 15 | B | $Al(i-Bu)_3$ + $MgBu_2$ | Trace | — | — | — |
| 16 | B | $Al(i-Bu)_3$ + Et Benzoate | 125.5 | 48,269 | 70.2 | 3.4 |

[a] 100 ml n-hexane; 220 g 1-butene; 2.6 mg Ti catalyst (0.054 mM) } Room temperature, 1 hour
[b] Al—alkyl = 5.60 mM
$MgBu_2$ = 2.80 mM
Et Benzoate = 1.90 mM (Examples 3, 9)
Et Benzoate = 0.32 mM (Examples 13, 16)
[c] A = $MgCl_2$—Et Benzoate-EtOH—$TiCl_4$; Ti = 4.12%; Centrifugal-type ball mill ground support
B = $MgCl_2$—Et Benzoate-EtOH—$TiCl_4$; Ti = 1.34%; Centrifugal-type ball mill ground support

EXAMPLES 17 to 25

Following the procedure of Example 1, a mixture of 50% 1-butene and 50% 2-butene was polymerized with catalysts containing a titanium complex of magnesium dichloride, ethyl benzoate, ethanol and titanium tetrachloride, and a cocatalyst mixture of diethyl aluminum chloride and dibutyl magnesium. The results are shown in Table II. Various trialkyl aluminum cocatalysts are also shown for comparison.

The supported titanium complexes designated "Catalyst B" and "Catalyst C" in Table II were prepared in a manner similar to that of "Catalyst A", described above.

TABLE II
Polymerization of Mixed-Butene With $AlEt_2Cl$ + $MgBu_2$[a]

| Example | Catalyst[c] | Cocatalyst[b] | Yield g | g PB/g Ti | Ether Insoluble % |
|---|---|---|---|---|---|
| 17 | B | $AlEt_2Cl$ + $MgBu_2$ | 97.6 | 37,538 | 40.0 |
| 18 | B | $AlEt_2Cl$ + $MgBu_2$ + Et Benzoate | 13.4 | 5,154 | 84.4 |
| 19 | B | $Al(i-Bu)_3$ | 23.2 | 8,923 | 68.6 |
| 20 | C | $AlEt_2Cl$ + $MgBu_2$ | 92.0 | 35,392 | 28.4 |
| 21 | C | $AlEt_2Cl$ + $MgBu_2$ + Et Benzoate | 7.6 | 2,931 | 82.4 |
| 22 | C | $Al(i-Bu)_3$ | 23.6 | 9,077 | 69.2 |
| 23 | C | $Al(i-Bu)_3$ + $MgBu_2$ | Trace | — | — |
| 24 | C | $AlEt_3$ | 10.5 | 4,027 | 50.6 |
| 25 | C | $AlEt_3$ + $MgBu_2$ | Trace | — | — |

[a] 100 ml n-hexane; 220 g mixed-butene; 2.6 mg Ti catalyst (0.054 mM Ti) } Room temperature, 1 hour
[b] Al—alkyl = 5.60 mM
$MgBu_2$ = 2.80 mM
Et Benzoate = 0.63 mM

TABLE II-continued

Polymerization of Mixed-Butene With AlEt$_2$Cl + MgBu$_2{}^a$ $^c$B = MgCl$_2$—Et Benzoate-EtOH—TiCl$_4$; Ti = 1.34%; Centrifugal-type ball mill ground support
C = MgCl$_2$—Et Benzoate-EtOH—TiCl$_4$; Ti = 3.93%; Ball mill ground support

EXAMPLES 26 to 36

Following the procedure of Example 1, propylene was polymerized with catalysts containing a titanium complex of magnesium dichloride, ethyl benzoate, ethanol and titanium tetrachloride, and a cocatalyst mixture of diethyl aluminum chloride and dibutyl magnesium. The results are shown in Table III. Trialkyl aluminum cocatalysts are also shown for comparison.

EXAMPLES 37 to 56

Propylene, 1-butene, and a 50/50 mixture of 1-butene and 2-butene were polymerized following the procedure of Example 1. Various catalysts were employed containing a titanium complex and an alkyl aluminum cocatalyst. The results which are shown in Table IV demonstrate the effect of dibutyl magnesium on various alkyl aluminum cocatalysts. More specifically, Table IV shows that dibutyl magnesium activates alkyl aluminum halides for olefin polymerization while it completely deactivates aluminum trialkyls.

TABLE III

Polymerization of Propylene With AlEt$_2$Cl + MgBu$_2{}^a$

| Example | Ti Catalyst$^c$ | Cocatalyst$^b$ | Yield g | Yield g PP/g Ti | n-Heptane Insoluble % | Reduced Specific Viscosity, h$_{sp}$/C |
|---|---|---|---|---|---|---|
| 26 | A | AlEt$_2$Cl + MgBu$_2$ | 164.4 | 63,250 | 58.0 | 1.6 |
| 27 | A | AlEt$_2$Cl + MgBu$_2$ + Et Benzoate | 58.4 | 22,481 | 92.2 | 7.8 |
| 28 | A | AlEt$_2$Cl | 15.9 | 6,131 | 49.0 | 2.3 |
| 29 | A | Al(i-Bu)$_3$ | 89.3 | 34,338 | 42.0 | 2.3 |
| 30 | A | Al(i-Bu)$_3$ + Et Benzoate | 2.6 | 996 | 99.0 | Insoluble |
| 31 | C | AlEt$_2$Cl + MgBu$_2$ | 158.7 | 61,038 | 57.2 | 1.6 |
| 32 | C | AlEt$_2$Cl + MgBu$_2$ + Et Benzoate | 70.6 | 27,154 | 92.4 | 3.0 |
| 33 | C | AlEt$_2$Cl | 18.7 | 7,192 | 44.0 | — |
| 34 | C | Al(i-Bu)$_3$ | 144.0 | 55,385 | 45.0 | 1.4 |
| 35 | C | Al(i-Bu)$_3$ + MgBu$_2$ | 7.0 | 2,692 | 64.6 | — |
| 36 | C | Al(i-Bu)$_3$ + Et Benzoate | 42.7 | 16,423 | 86.6 | 2.8 |

$^a$100 ml n-hexane, 120 psi propylene, 2.6 mg Ti catalyst (0.054 mM), 50° C., 3 hours
$^b$Al—alkyl = 5.60 mM
MgBu$_2$ = 2.80 mM
Et Benzoate = 1.90 mM
$^c$A = MgCl$_2$—Et Benzoate-EtOH—TiCl$_4$; Ti = 4.12%; Centrifugal-type ball mill ground support
C = MgCl$_2$—Et Benzoate-EtHO—TiCl$_4$; Ti = 3.93%; Ball mill ground support

TABLE IV

Effect of MgBu$_2$ on Al—Alkly Catalysts

| Example | Monomer | Catalyst* | Cocatalyst | Yield g | g Polymer g Ti | Insoluble % | Reduced Specific Viscosity, h$_{sp}$/C |
|---|---|---|---|---|---|---|---|
| 37 | 1-Butene | A | AlEt$_2$Cl | 0.8 | 312 | — | 3.0 |
| 38 | 1-Butene | A | AlEt$_2$Cl + MgBu$_2$ | 205.4 | 78,981 | 40.2 | 2.5 |
| 39 | 1-Butene | B | AlEt$_2$Cl + MgBu$_2$ | 237.0 | 91,269 | 61.4 | 1.8 |
| 40 | 1-Butene | A | AlEtCl$_2$ | None | — | — | — |
| 41 | 1-Butene | A | AlEtCl$_2$ + MgBu$_2$ | 65.6 | 25,246 | 51.6 | 2.4 |
| 42 | 1-Butene | A | Al(i-Bu)$_3$ | 54.1 | 20,800 | 67.6 | 5.6 |
| 43 | 1-Butene | A | Al(i-Bu)$_3$ + MgBu$_2$ | Trace | — | — | — |
| 44 | 1-Butene | B | Al(i-Bu)$_3$ | 102.5 | 39,438 | 82.0 | 4.1 |
| 45 | 1-Butene | B | Al(i-Bu)$_3$ + MgBu$_2$ | Trace | — | — | — |
| 46 | 1-Butene | A | AlEt$_3$ | Trace | — | — | — |
| 47 | 1-Butene | A | AlEt$_3$ + MgBu$_2$ | Trace | — | — | — |
| 48 | Mixed-Butene | C | AlEt$_2$Cl + MgBu$_2$ | 92.0 | 35,392 | 28.4 | |
| 49 | Mixed-Butene | C | Al(i-Bu)$_3$ | 23.6 | 9,077 | 69.2 | |
| 50 | Mixed-Butene | C | Al(i-Bu)$_3$ + MgBu$_2$ | Trace | — | — | — |
| 51 | Mixed-Butene | C | AlEt$_3$ | 10.6 | 4,027 | 50.6 | |
| 52 | Mixed-Butene | C | AlEt$_3$ + MgBu$_2$ | Trace | — | — | — |
| 53 | Propylene | C | AlEt$_2$Cl | 18.7 | 7,192 | 44.0 | |
| 54 | Propylene | C | AlEt$_2$Cl + MgBu$_2$ | 158.7 | 61,038 | 57.2 | |
| 55 | Propylene | C | Al(i-Bu)$_3$ | 144.0 | 55,385 | 45.0 | |
| 56 | Propylene | C | Al(i-Bu)$_3$ + MgBu$_2$ | 7.0 | 2,692 | 64.6 | |

*A = MgCl$_2$—Et Benzoate-EtOH—TiCl$_4$; Ti = 4.12%; Centrifugal-type ball mill ground support
B = MgCl$_2$—Et Benzoate-EtOH—TiCl$_4$; Ti = 1.34%; Centrifugal-type ball mill ground support
C = MgCl$_2$—Et Benzoate-EtOH—TiCl$_4$; Ti = 3.93%; Ball mill ground support

EXAMPLES 57 to 73

Following the procedure of Example 1, propylene was polymerized using various mixed metal alkyl cocatalysts. The results are summarized in Table V. Table V demonstrates that dialkyl magnesium and alkyl lithium provide active cocatalysts when combined with alkyl aluminum halides, whereas other metal alkyls, such as dialkyl zinc and trialkyl boron, give inactive cocatalysts when combined with alkyl aluminum halides. Table V further demonstrates that butyl lithium and dibutyl magnesium deactivate the otherwise active trialkyl aluminum cocatalysts.

The preparation of the supported titanium complex used in these examples ($MgCl_2$/Et Benzoate/$SiCl_4$/$TiCl_4$; Ti=1.90%) is described in Example 1.

TABLE V

Polymerization of Propylene[a] - Effect of Cocatalyst[b]

| Example | Cocatalyst | (mM) | Yield g | g PP/g Ti | Conv. % | n-Heptane Insoluble % | Reduced Specific Viscosity, h$_{sp}$/C |
|---|---|---|---|---|---|---|---|
| 57 | $AlEt_2Cl$ | (1.4) | 10.0 | 17,000 | 8.0 | 22.0 | 1.0 |
| 58 | $MgBu_2$ | (0.7) | 0.5 | 849 | 0.4 | | |
| 59 | $AlEt_2Cl/MgBu_2$ | (1.4/0.7) | 122.0 | 207,100 | 98.0 | 50.0 | 1.6 |
| 60 | $AlEt_2Cl/Mg(C_6H_{13})_2$ | (1.4/0.7) | 28.0 | 47,500 | 22.0 | 55.0 | 2.4 |
| 61 | $AlEt_2Cl/LiBu$ | (1.4/1.4) | 86.0 | 146,000 | 69.0 | 52.0 | 1.5 |
| 62 | $AlEt_2Cl/ZnEt_2$ | (1.4/0.7) | 2.0 | 3,400 | 2.0 | | |
| 63 | $AlEt_2Cl/BEt_3$ | (1.4/0.7) | 7.0 | 11,900 | 6.0 | | 2.3 |
| 64 | $AlEtCl_2$ | (1.4) | 0.0 | 0 | 0.0 | 0.0 | |
| 65 | $AlEtCl_2/MgBu_2$ | (1.4/0.7) | 67.0 | 114,000 | 54.0 | 40.0 | 1.8 |
| 66 | $AlEtCl_2/MgBu_2$ | (1.4/1.4) | 23.0 | 39,000 | 18.0 | 59.0 | 2.2 |
| 67 | $Al(i-Bu)_3$ | (1.4) | 119.0 | 202,000 | 95.0 | 40.0 | 1.6 |
| 68 | $Al(i-Bu)_3/MgBu_2$ | (1.4/0.7) | 9.0 | 15,300 | 7.0 | 80.0 | 1.4 |
| 69 | $Al(i-Bu)_3/Mg(C_6H_{13})_2$ | (1.4/0.7) | 0.0 | 0 | 0.0 | 0.0 | |
| 70 | $Al(i-Bu)_3/LiBu$ | (1.4/1.4) | Trace | Trace | — | — | — |
| 71 | $AlEt_3$ | (1.4) | 78.0 | 132,400 | 62.0 | 48.0 | 2.4 |
| 72 | $AlEt_3/MgBu_2$ | (1.4/0.7) | 5.0 | 8,500 | 4.0 | | 2.7 |
| 73 | $Al(i-Bu)_3/MgBu_2/AlEt_2Cl$ | (1.4/0.7/1.4) | 99.0 | 168,100 | 79.0 | 40.0 | 2.1 |

[a]163 g n-hexane, 125 g propylene, 50° C., 3 hours
[b]Catalyst = 0.589 mg Ti (0.0123 mM); $MgCl_2$/Et Benzoate/$SiCl_4$/$TiCl_4$; Ti = 1.90%

EXAMPLES 74 to 81

Following the procedure of Example 1, propylene was polymerized with catalysts containing various supported titanium tetrachloride complexes and mixed metal alkyl cocatalysts. The results are shown in Table VI. Table VI demonstrates the superior performance of the mixed metal alkyl cocatalysts, as compared to trialkyl aluminum cocatalysts, when combined with a broad range of supported titanium catalysts.

TABLE VI

Polymerization of Propylene - Catalyst Comparison

| Example | Propylene (99.9+%) | Catalyst | Ti in Catalyst % | Ti mg | Cocatalyst | (mM) | Time hrs. | Temp. °C. | Yield g PP/g Ti | n-Heptane Insoluble % |
|---|---|---|---|---|---|---|---|---|---|---|
| 74 | 120 psi | $MgCl_2$/Et Benzoate/EtOH/$TiCl_4$ | 3.93 | 2.59 | $AlEt_2Cl$ $MgBu_2$ Et Benzoate | 5.60 2.80 1.90 | 3 | 50 | 27,000 | 92 |
| 75 | 120 psi | $MgCl_2$/Et Benzoate/Et OH/$TiCl_4$ | 3.93 | 2.59 | $Al(i-Bu)_3$ Et Benzoate | 5.60 1.90 | 3 | 50 | 16,000 | 87 |
| 76 | 120 psi | $MgCl_2$/Et Benzoate/o-Cresol/$TiCl_4$ | 3.66 | 0.92 | $AlEt_2Cl$ $MgBu_2$ Et Benzoate | 1.40 0.70 0.47 | 3 | 50 | 69,000 | 85 |
| 77 | 120 psi | $MgCl_2$/Et Benzoate/o-Cresol/$TiCl_4$ | 3.66 | 0.92 | $Al(i-Bu)_3$ Et Benzoate | 1.40 0.47 | 3 | 50 | 32,000 | 86 |
| 78 | 120 psi | $MgCl_2$/Et Benzoate/$SiCl_4$/$TiCl_4$ | 5.81 | 0.87 | $AlEt_2Cl$ $MgBu_2$ Et Benzoate | 1.40 0.70 0.47 | 3 | 50 | 131,000 | 88 |
| 79 | 120 psi | $MgCl_2$/Et Benzoate/$SiCl_4$/$TiCl_4$ | 5.81 | 0.87 | $Al(i-Bu)_3$ Et Benzoate | 1.40 0.47 | 3 | 50 | 75,000 | 92 |
| 80 | Liquid | $MgCl_2$/Et Benzoate/$SiCl_4$/$TiCl_4$ | 1.90 | 0.59 | $AlEt_2Cl$ $MgBu_2$ Et Benzoate | 1.40 0.70 0.47 | 3 | 50 | 200,000 | 92 |
| 81 | Liquid | $MgCl_2$/Et Benzoate/ | 1.90 | 0.59 | $Al(i-Bu)_3$ Et Benzoate | 1.40 0.47 | 3 | 50 | 120,000 | 91 |

TABLE VI-continued

Polymerization of Propylene - Catalyst Comparison

| Example | Propylene (99.9+%) | Catalyst | Ti in Catalyst % | Ti mg | Cocatalyst | (mM) | Time hrs. | Temp. °C. | Yield g PP/g Ti | n-Heptane Insoluble % |
|---|---|---|---|---|---|---|---|---|---|---|
| | | SiCl₄/TiCl₄ | | | | | | | | |

EXAMPLES 82 to 85

Following the procedure of Example 1, refinery propylene was polymerized using a cocatalyst mixture of diethyl aluminum chloride and dibutyl magnesium. The results are summarized in Table VII. A trialkyl aluminum cocatalyst is shown for comparison. Table VII demonstrates the superior performance of the mixed metal alkyl cocatalyst, as compared to trialkyl aluminum, in polymerizing propylene from a relatively impure refinery feed.

TABLE VII

Polymerization of Refinery Propylene$^a$

| Example | Ti$^b$ mg | AlEt₂Cl/MgBu₂/Et Benzoate mM | | | Al(i-Bu)₃/Et Benzoate mM | | Yield g | g PP/g Ti | Conv. % | n-Heptane Insoluble % | Reduced Specific Viscosity, h$_{sp}$/C |
|---|---|---|---|---|---|---|---|---|---|---|---|
| 82 | 0.589 | 1.4 | 0.7 | 0.47 | | | 57 | 97,000 | 46 | 89 | 2.8 |
| 83 | 1.178 | 2.8 | 1.4 | 0.94 | | | 106 | 90,000 | 85 | 92 | 4.0 |
| 84 | 1.178 | 2.8 | 1.4 | 1.29 | | | 75 | 63,700 | 60 | 97 | |
| 85 | 1.178 | | | | 2.8 | 0.94 | 56 | 47,500 | 45 | 94 | |

Analysis of Refinery Propylene

| Component | % |
|---|---|
| propylene | 57.80 |
| propane | 21.30 |
| isobutane | 13.10 |
| n-butane | 0.30 |
| 1-butane | 1.70 |
| isobutylene | 2.50 |
| trans-2-butene | 0.45 |
| cis-2-butene | 0.13 |

$^a$50° C., 3 hours
51 g n-hexane
216 g refinery propylene (125 g propylene)
$^b$Catalyst = MgCl₂/Et Benzoate/SiCl₄/TiCl₄; Ti = 1.90%

What is claimed is:

1. A catalyst composition for use in polymerizing alpha olefins which comprises:
   (a) a solid supported titanium tetrahalide complex, wherein said complex is prepared by contacting a mechanically pulverized solid support with titanium tetrahalide in the absence of mechanical pulverization, and
   (b) a cocatalyst comprising a mixture of a dialkyl aluminum halide and a dialkyl magnesium compound.

2. The composition according to claim 1, wherein the cocatalyst comprises a mixture of a dialkyl aluminum chloride and a dialkyl magnesium compound.

3. The composition according to claim 2, wherein the cocatalyst comprises a mixture of diethyl aluminum chloride and dibutyl magnesium.

4. The composition according to claim 1, wherein the molar ratio of aluminum to magnesium is 1:5 to 5:1.

5. The composition according to claim 1, wherein the cocatalyst further comprises a Lewis base.

6. The composition according to claim 5, wherein the Lewis base is an aromatic carboxylic acid ester.

7. The composition according to claim 6, wherein the Lewis base is ethyl benzoate.

8. The composition according to claim 1, wherein the mechanically pulverized solid support comprises a magnesium dihalide, an aromatic carboxylic acid ester and an alcohol or phenol.

9. The composition according to claim 1, wherein the mechanically pulverized solid support comprises a magnesium dihalide, an aromatic carboxylic acid ester and silicon tetrachloride.

10. The composition according to claim 8, wherein the titanium tetrahalide is titanium tetrachloride and the mechanically pulverized solid support comprises magnesium dichloride, ethyl benzoate and ethanol.

11. The composition according to claim 8, wherein the titanium tetrahalide is titanium tetrachloride and the mechanically pulverized solid support comprises magnesium dichloride, ethyl benzoate and cresol.

12. The composition according to claim 9, wherein the titanium tetrahalide is titanium tetrachloride and the mechanically pulverized solid support comprises magnesium dichloride, ethyl benzoate and silicon tetrachloride.

* * * * *